(12) United States Patent
Paillet et al.

(10) Patent No.: US 9,090,032 B2
(45) Date of Patent: Jul. 28, 2015

(54) LENS BLOCKING METHOD AND RELATED DEVICE

(75) Inventors: Romain Paillet, Charenton le Pont (FR); Yannick Gordiet, Charenton le Pont (FR)

(73) Assignee: ESSILOR INTERNATIONAL (COMPAGNIE GENERALE D'OPTIQUE), Charenton Le Pont (FR)

( * ) Notice: Subject to any disclaimer, the term of this patent is extended or adjusted under 35 U.S.C. 154(b) by 1071 days.

(21) Appl. No.: 13/139,975

(22) PCT Filed: Dec. 9, 2009

(86) PCT No.: PCT/EP2009/066759
§ 371 (c)(1),
(2), (4) Date: Jun. 15, 2011

(87) PCT Pub. No.: WO2010/069846
PCT Pub. Date: Jun. 24, 2010

(65) Prior Publication Data
US 2011/0250823 A1 Oct. 13, 2011

(30) Foreign Application Priority Data
Dec. 15, 2008 (EP) .................................... 08305945

(51) Int. Cl.
*B24B 49/12* (2006.01)
*B24B 13/005* (2006.01)
*B29D 11/00* (2006.01)

(52) U.S. Cl.
CPC ........ *B29D 11/00942* (2013.01); *B24B 13/005* (2013.01)

(58) Field of Classification Search
CPC ...... B24B 13/005; B24B 13/00; B24B 13/06; B24B 13/0055; B24B 49/00; B29D 11/00
USPC ........................... 451/388, 384, 390, 42, 5, 6
See application file for complete search history.

(56) References Cited

U.S. PATENT DOCUMENTS 3,951,203 A * 4/1976 Prunier ......................... 164/334

FOREIGN PATENT DOCUMENTS

| EP | 1 093 907 A2 | 4/2001 |
| EP | 1 974 858 A1 | 10/2008 |
| EP | 1 997 586 A1 | 12/2008 |
| WO | WO 03/018254 A2 | 3/2003 |

* cited by examiner

*Primary Examiner* — Robert Rose
(74) *Attorney, Agent, or Firm* — Cozen O'Connor

(57) ABSTRACT

Method of blocking an unfinished optical lens to be machined, the unfinished optical lens comprising an unfinished face and a second face, the method comprising: an unfinished optical lens providing step in which the unfinished optical lens is provided; a positioning step in which the unfinished optical lens is positioned in a first reference position by positioning the unfinished face of the unfinished optical lens on the top of at least three pins; a preformed optical substrate block providing step in which a preformed optical substrate block is provided; a docking step in which the second face of the unfinished optical lens in the first reference position is docked to the docking surface of the preformed optical substrate block.

14 Claims, 2 Drawing Sheets

LENS BLOCKING METHOD AND RELATED DEVICE

RELATED APPLICATIONS

This is a U.S. National Phase Application under 35 USC 371 of International Application PCT/EP2009/066759 filed on Dec. 9, 2009.

This application claims the priority of European application no. 08305945.1 filed Dec. 15, 2008, the entire content of which is hereby incorporated by reference.

FIELD OF THE INVENTION

The invention relates to a method for blocking an unfinished optical lens to be machined and to a lens blocking system adapted to block an unfinished ophthalmic lens according to the method of the invention.

BACKGROUND OF THE INVENTION

The process of preparing optical or ophthalmic lenses begins with an unfinished or semi-finished glass or plastic optical lens. Typically, unfinished optical lens has a front face with a finished polished front surface and back face with an unfinished back surface. By grinding away material from the back surface of the optical lens, the required corrective prescription is generated. Thereafter, the surface having had the corrective prescription imparted thereto is polished. The peripheral edge of the processed optical lens is then provided with a final desired contour. Thereby establishing a finished optical or ophthalmic lens.

It is necessary during these various processing operations to securely block the optical lens in accurate position. This procedure is often referred to as "lens blocking".

The accuracy of the blocking device directly influences the lens machining accuracy; therefore high accuracy of the blocking device is required.

During the processing operation a desired prism and/or tore may be introduced. The desired prism may be either a prescription prism or a non-prescription prism, for example a thinning prism. The manufacturing of such desired prism and/or tore requires that the lens be oriented in a desired specific orientation with respect to the manufacturing tools. The introduced prism and/or tore requires a very accurate orientation of the semi-finished ophthalmic lens.

Conventionally, the method of blocking a semi-finished ophthalmic lens may comprise for example:

an orienting step in which the semi-finished ophthalmic lens is orientated using an orienting station, a moving step in which the orientated semi-finished ophthalmic lens is moved from the orienting station to a blocking station, and a blocking step in which the semi-finished ophthalmic lens is blocked on a blocking station.

The orienting step may comprise placing the finished face of the semi-finished ophthalmic lens on a positioning device, for example three pins, and orienting the ophthalmic lens.

Once oriented, the semi-finished ophthalmic lens must be blocked leaving the unfinished face of the semi-finished ophthalmic lens accessible for the manufacturing tools. Therefore, the conventional blocking method require a moving step in which the ophthalmic lens is moved from the orienting station to the blocking station.

As can be appreciated, the precision of these methods depends greatly upon the accuracy with which the semi-finished ophthalmic lens is moved from the positioning station to the blocking station.

In the past, emphasis has been placed on the precision in the positioning step and blocking step. The moving step has been of a secondary interest.

For this reason also, and despite the use of ultra-precision computer-controlled apparatus, ophthalmic lens generated nowadays are not always errorless.

SUMMARY OF THE INVENTION

One object of the present invention is to improve the blocking method of optical lens by providing a method for blocking an unfinished optical lens which is more easy to use and which enables to position the optical lens in a more reliable manner so as to ensure a more accurate machining of the lens.

This and other objects are attained by one aspect of the invention directed to a method of blocking an unfinished optical lens to be machined, the unfinished optical lens comprising an unfinished face and a second face, the method comprising:

an unfinished optical lens providing step in which the unfinished optical lens is provided;

a positioning step in which the unfinished optical lens is positioned in a first reference position by positioning the unfinished face of the unfinished optical lens on the top of at least three pins;

a preformed optical substrate block providing step in which a preformed optical substrate block is provided;

a docking step in which the second face of the unfinished optical lens in the first reference position is docked to the docking surface of the preformed optical substrate block.

According to an embodiment of the invention, the optical lens can be docked to the preformed optical substrate block in the first reference position without requiring a moving step. Therefore, the accuracy of the position and orientation of the unfinished optical lens may be increase, thus increasing the accuracy of the machining of the unfinished face of the unfinished optical lens.

According to further embodiments which can be considered alone or in combination:

during the preformed optical substrate providing step the preformed optical substrate block is provided in a solid state, the second face of the unfinished optical lens is a finished face, the method further comprises prior to the docking step:

a measuring step in which the spatial positions of at least three predefined points of the finished face of the unfinished optical lens in the first reference position are measured so as to obtain the measured position of the unfinished optical lens;

a preformed optical substrate block orienting step in which the preformed optical substrate block is oriented in a second reference position according to the measured position of the unfinished optical lens;

the method further comprises a blocking step (S21) in which the unfinished optical lens is blocked in the first reference position;

the method further comprises after the measuring step and prior to the preformed optical substrate block orienting step an unfinished optical lens orienting step in which the unfinished optical lens in the first reference position is oriented in a second reference position;

the method further comprises a surface heating step in which at least part of the docking surface of the preformed substrate block is heated at a docking temperature greater than or equal to 50° C. and smaller than or equal to 60° C.;

the preformed optical substrate block is made of a thermoplastic material having a softening point greater than or equal to 60° C. and smaller than or equal to 85° C.; and prior to the positioning step the top of the at least three pins are placed in a plane.

According to another aspect, the invention relates also to an unfinished optical lens blocking system for blocking an unfinished optical lens on to a preformed optical substrate block, the unfinished optical lens comprising an unfinished face and a second face, the blocking system comprising:

a positioning device suitable for positioning the unfinished optical lens in a first reference position, the positioning device comprising at least three pins suitable for receiving on the top of the three pins the unfinished face of the unfinished optical lens;

a preformed optical substrate block receiving device suitable for receiving a preformed optical substrate block;

a docking device suitable for docking the second face of the unfinished optical lens in the first reference position to the docking surface of the preformed optical substrate block.

According to further embodiments which can be considered alone or in combination:

the preformed optical substrate block receiving device is suitable for orienting the preformed optical substrate block in a second reference position, and the blocking system further comprises a measuring device suitable for measuring the spatial positions of at least three points of the finished face of an unfinished optical lens in the first reference position so as to obtain the measured position of the unfinished optical lens;

the system further comprises a blocking device suitable for blocking the unfinished optical lens in the first reference position;

the blocking system further comprises an unfinished optical lens orienting device suitable for orienting the unfinished optical lens from the first reference position to a second reference position;

the blocking system further comprises a heating device suitable for heating the docking surface of the preformed substrate block at a docking temperature greater than or equal to 50° C. and smaller than or equal to 60° C.; and the preformed optical substrate block receiving device, the docking device, the measuring device and the preformed optical substrate block orienting device are arranged on a rotating tower.

Another aspect of the invention relates to a computer program product for a data processing device, the computer program product comprising a set of instructions which, when loaded into the data processing device, causes the data processing device to perform at least one, for example all, of the steps, for example the calculating step, of the method according to the invention.

Another aspect of the present invention relates to a computer-readable medium carrying one or more set of instructions of a computer program product of the invention.

In the sense of the invention the wordings "unfinished optical lens" refers to optical lens comprising an unfinished face and a second face. According to embodiments of the invention the second face of the unfinished optical lens is a finished face.

In the sense of the invention the preformed optical substrate block is in a solid state.

In the sense of the invention "machining an unfinished optical lens" may correspond to manufacturing and/or polishing and/or grinding the unfinished optical lens.

In the sense of the invention "Shellac" is a resin made of Lac. Lac being the scarlet resinous secretion of a number of species of Lac-producing insects, the most commonly cultivated of which is Kerria lacca.

In the sense of the invention the "softening point" is measured using the well known "ball-ring" method as described in standard NF EN 1238 "Determination of the softening point of thermoplastic adhesives"—December 1999.

According to the well known "ball-ring method", a steel ball of a given dimension, for example 9.53 mm, and mass, for example 3.5 g, is placed on a sample of thermoplastic material contained on a metal ring of specified dimensions. The apparatus is heated at a constant rate, for example 5° C./min from at least 10° C. below the expected softening point. The "softening point" corresponds to the temperature at which the sample is sufficiently soft to allow the ball to pass through the metal ring.

In the sense of the invention the "hardness" corresponds to the Shore "D" hardness, using the measuring method described in standard ASTM D2240.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer or Very high speed integrated circuit Hardware Description Language ("VHDL"), or Complex Instruction Set Computer ("CISC") architecture, for example X 86, or Reduced Instruction Set Computer ("RISC") architecture, for example ARM.

Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Figure 1:
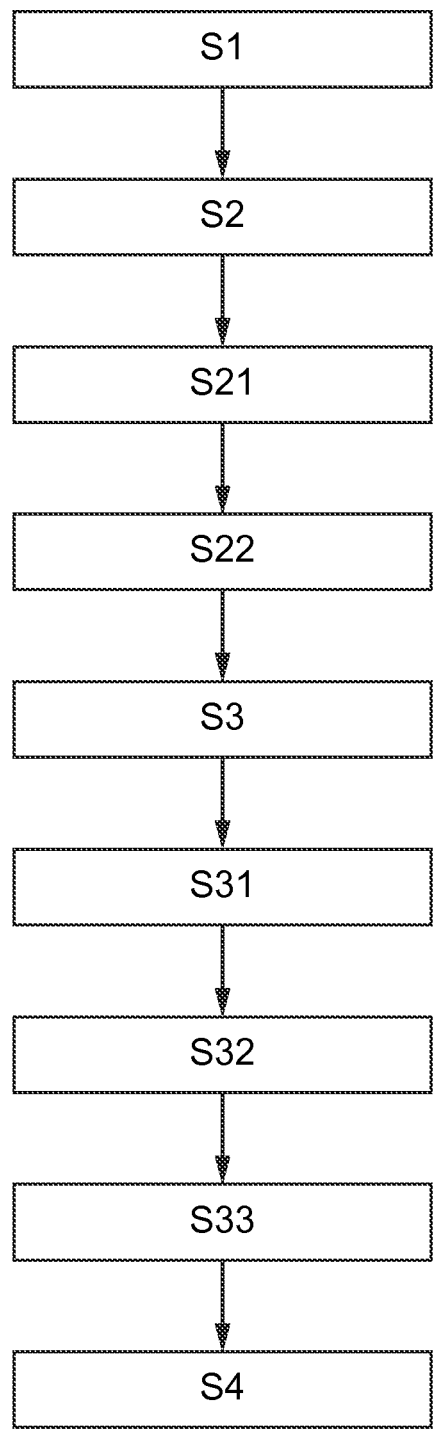
FIG. 1 is a flowchart of the steps comprised in a method of blocking an unfinished optical lens according to an embodiment of the invention.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION OF THE DRAWINGS

According to an embodiment of the invention the method of blocking an unfinished optical lens to be machined comprises:

- an unfinished optical lens providing step S1 in which the unfinished optical lens is provided;
- a positioning step S2 in which the unfinished optical lens is positioned in a first reference position by positioning the unfinished face of the unfinished optical lens on the top of at least three pins;
- a preformed optical substrate block providing step S3 in which a preformed optical substrate block is provided;
- a docking step S4 in which the second face of the unfinished optical lens in the first reference position is docked to the docking surface of the preformed optical substrate block.

As explained here above, positioning the unfinished face of the unfinished optical lens on the top of at least three pins allows having the second face of the unfinished optical lens dock to the docking surface of the preformed optical substrate block without requiring a moving step.

Conventional blocking method may require the use of a large number of components, for example a cylindrical member, a ring member, three rollers, three lever members, biasing means, holding portion releasing means and the like. The process according to the invention allows blocking a unfinished optical lens in an accurate position without the use of such large number of components, in particular without the use of blocking rings.

Advantageously, the accuracy of the position of the unfinished optical lens when blocked is increased and the blocking method is more practical. Thus, the accuracy of the machining of the unfinished face of the unfinished optical lens is increased allowing providing an optical lens of improved optical quality.

The second face of the unfinished optical lens provided in the unfinished optical lens providing step S1, may be a finished face or an unfinished face.

During the positioning step the operator may position manually the unfinished face of the unfinished optical lens on the pins.

According to an embodiment of the invention, prior to the positioning step the top of the three pins are placed in a plane. The plane may be a plane of reference for the measurements.

According to an embodiment of the invention, during the positioning step an unfinished optical lens is manually placed on the three pins. The image of the second surface of the unfinished optical lens as seen by a camera, placed over the second surface, is instantly displayed with a superposed computer generated image of the second surface of the unfinished optical lens in the first reference position.

Advantageously, an operator can thereby easily position the unfinished optical lens in the first reference position.

According to an embodiment of the invention, the method may further comprise after the positioning step S2 a blocking step S21 in which the unfinished optical lens is blocked in the first reference position on the pins. Blocking the unfinished optical lens in the first reference position reduces the risk of introducing a position error after the positioning step, for example by accidentally moving the unfinished optical lens.

According to an embodiment of the invention the unfinished optical lens may be a semi-finished optical lens whose second face is finished. According to such embodiment, after the positioning step S2 or the blocking step S21, the method may further comprise a measuring step S22 in which the spatial positions of at least three points of the finished face of the semi-finished optical lens in the first reference position are measured so as to obtain the measured position of the unfinished optical lens.

The finished face of the semi-finished optical lens being known with accuracy it is possible to determine the orientation, of example the tilt, of the semi-finished optical lens in the first reference position by measuring the spatial positions of three predetermined point of the finished face of the semi-finished optical lens. Indeed the measured position of the three predetermined points can be compared with the computer generated position of the three points. Therefore, one can determine the difference in position between the computer generated position and the measured position.

Placing the semi-finished optical lens on the unfinished face may introduce some error in the position of the semi-finished optical lens since the unfinished face is not known with the same accuracy as the finished face.

Comparing the computer generated position of the three predetermined points with the measured position of the three predetermined points allows obtaining an accurate position of the semi-finished optical lens although the semi-finished optical lens is placed on the unfinished face.

Advantageously, the error in the position introduced by placing the unfinished optical lens on the unfinished face may be measured. Therefore, the error may be corrected when orienting the unfinished optical lens and/or the preformed optical substrate block. Thus, accuracy of the position of the unfinished optical lens relative to the preformed optical substrate block is increased. Therefore, the accuracy of the machining process of the unfinished optical lens is increased.

According to an embodiment of the invention, the preformed optical substrate provided during the preformed optical substrate providing step may be made of a thermoplastic material having a softening point greater than or equal to 60° C., for example greater than or equal to 70° C. and smaller than or equal to 85° C. According to an embodiment of the invention, the thermoplastic material has a softening point different than 75° C., for example greater than 75° C. and smaller than or equal to 85° C.

Advantageously, the thermoplastic material according to the invention presents a softening point and does not go through a sharp transition from a solid state to a molten state. Therefore, the thermoplastic material according to the invention when heated at a temperature greater or equal to 60° C. and smaller or equal to 85° C., keeps its shape.

The thermoplastic material according to the invention may be formulated from a composition comprising as a percentage by weight of the thermoplastic material, at least or equal to 60%, for example at least or equal to 65% and/or at most or equal to 80%, for example at least or equal to 75%, of shellac and/or at least or equal to 20%, for example at least or equal to 25% and/or at most or equal to 40%, for example most or equal to 35%, of plasticizer.

Surprisingly, the inventors have observed that when the shellac and the plasticizer are mixed in such proportions the thermoplastic material has physical properties, for example a softening point and hardness, appropriate to be used as a blocking material for optical substrates and offering a suitable temperature range for blocking.

The thermoplastic material according to the invention may be formulated from a composition comprising a wide variety of additives depending upon the desired end use. Suitable additives include solvents, diluents, plasticizers, pigments, dyes, inorganic and organic fibrous or particulate reinforcing or extending fillers, nucleating agents, thixotropic agents, indicators, inhibitors, stabilizers, UV or IR absorbers, and the like.

According to an embodiment of the invention, the thermoplastic material composition may comprise, as a percentage by weight of the thermoplastic material, at most or equal to 10%, for example at most or equal to 5% of additives.

The shellac selected may comprise waxed shellac and/or dewaxed shellac and/or bleached shellac.

According to an embodiment of the invention the plasticizer may comprise at least 80%, for example at least 95%, of rosin or modified rosin. The modified rosin may be ester of rosin, for example triethylene glycol ester of stabilized gum rosin or Resiester T3 sold by Luresa.

According to another embodiment of the invention the plasticizer comprises at least 80%, for example 95% of hydrocarbon-based resin. The hydrocarbon-based resin may be C5 aliphatic hydrocarbon resin, for example the Wingtack 10 sold by Cray. Valley.

According to an embodiment of the invention, the unfinished optical lens may be oriented in a second reference position during an unfinished optical lens orienting step S31. The unfinished optical lens may be oriented so as to be able to introduce a desired prism and/or tore to the unfinished optical lens during the manufacturing process. The accuracy of the second reference position may be checked using a second measuring step in which the spatial positions of three predetermined points of the finished surface of the unfinished optical lens are measured and compared to the computer generated position of said three points.

According to an embodiment of the invention, the preformed optical substrate block may be oriented during a preformed optical substrate block orienting step S32. The preformed optical substrate block may be oriented so as to be able to introduce a desired prism and/or tore to the unfinished optical lens during the manufacturing process.

According to an embodiment of the invention, both the unfinished optical lens and the preformed optical substrate block may be oriented so as to introduce the desired prism and/or tore to the unfinished optical lens during the manufacturing process.

According to an embodiment of the invention, the method may further comprise a second measuring step in which the spatial positions of at least three predefined points of the finished face of the unfinished optical lens in the second reference position are measured so as to obtain the measured position of the unfinished optical lens.

According to an embodiment of the invention, the method further comprises a surface heating step S33 in which at least part of the docking surface of the preformed substrate block is heated at a docking temperature greater than or equal to 50° C. and smaller than or equal to 60° C.

Advantageously, heating only the docking surface of the preformed substrate block is heated at such a docking temperature reduces the influence of heat shrinkage that may introduce instability in the lens dioptric power.

The method according to the invention further comprise a docking step S4 in which the second face of the unfinished optical lens is docked to the docking surface of the preformed optical substrate block. The unfinished optical lens may be in the first or second reference position.

After the docking step, the unfinished optical lens and the preformed optical substrate block are sent to the machining station so as to machine the unfinished face of the lens.

Figure 2:
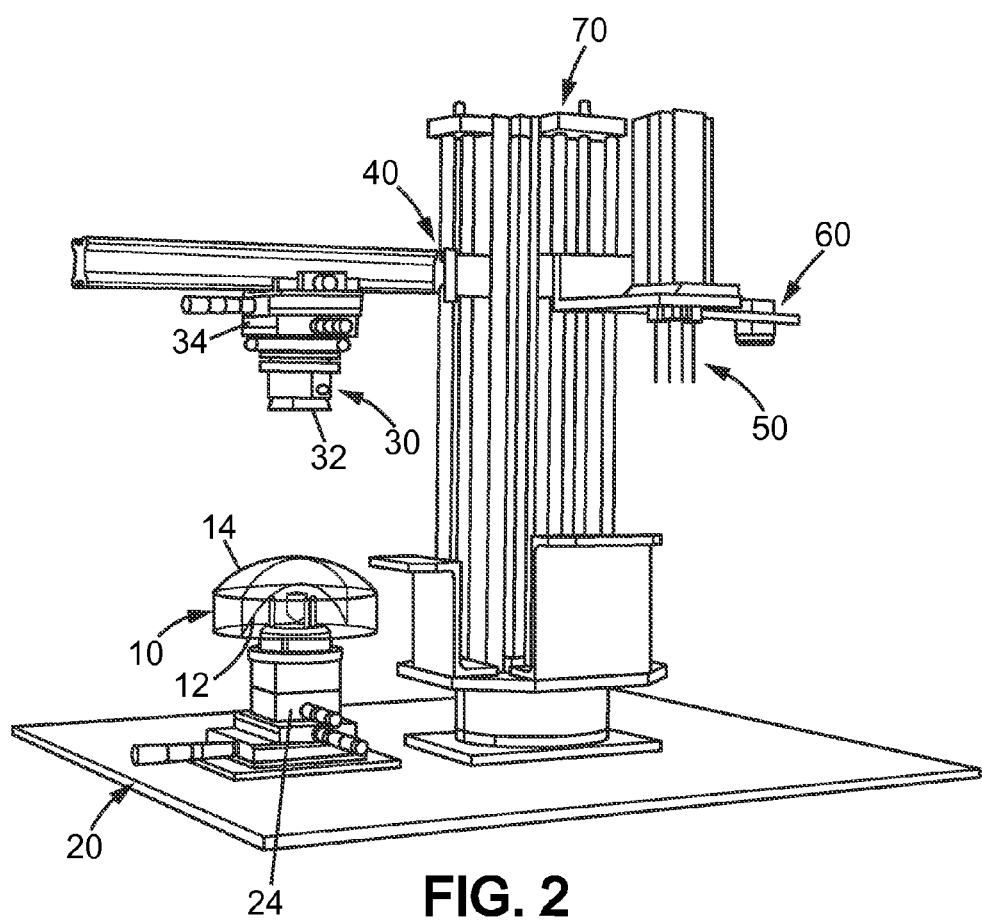
FIG. 2 is a schematic representation of a blocking device according to an embodiment of the invention.

As illustrated on FIG. 2, the invention also relates to an unfinished optical lens blocking system for blocking an unfinished optical lens 10 on to a preformed optical substrate block 32.

The blocking system illustrated on FIG. 2, comprises:
- a positioning device 20 arranged to position the unfinished optical lens 10 in a first reference position,
- a preformed optical substrate block receiving device 30 arranged to receive a preformed optical substrate block 32;
- a docking device 40 arranged to dock the second face 14 of the unfinished optical lens 10 in the first reference position to the docking surface of the preformed optical substrate block 32,
- a measuring device 50 arranged to measure the position and orientation of the unfinished optical lens 10,
- a control device 60 arranged to control the position of the unfinished optical lens 10.

According to an embodiment of the invention and as represented on FIG. 2, the preformed optical substrate block receiving device 30, the docking device 40 and the measuring device 50 are arranged on a rotating tower 70.

Advantageously, the blocking system provides a more accurate position of the unfinished optical lens in the first and/or second reference positions and during the docking of the unfinished optical lens to the preformed optical substrate block.

According to an embodiment of the invention, the positioning device 20 may comprise a plurality of at least three pins, for example four pins. The pins are arranged so as to receive the unfinished face of an unfinished optical lens. Furthermore, the plurality of pins may be arranged so as to have the top of each pins in a reference plane.

Advantageously, the plane may be used as a plane of reference for the measurements when using the blocking device to carry out the method according to the invention.

According to an embodiment of the invention, the positioning device 20 may comprises blocking means (not represented on FIG. 2) arranged to block an unfinished optical lens 10 in a first reference position. The blocking device may comprise a vacuum device arranged to block an unfinished optical lens.

According to an embodiment of the invention, the blocking system may further comprise an orienting device arranged to orient an unfinished optical lens, for example from a first reference position to a second reference position. The orienting device may comprise means to tilt the reference plane defined by the top of the plurality of pins.

Advantageously, an unfinished optical lens placed on the top of the plurality of pins may be tilted according to the desired prism to be introduced when using the blocking system to carry out the method of the invention.

According to an embodiment of the invention, the preformed optical substrate block receiving device 30 may also comprise an orienting device 34 so as to tilt the received preformed optical substrate block. The preformed optical substrate block may be tilted or based according to the desired prism or tore to be introduced to an unfinished optical lens.

The docking device 40 may comprise a heating device suitable for heating the docking surface of the preformed substrate block at a docking temperature greater than or equal to 50° C. and smaller than or equal to 60° C. The heating device may comprise an IR source and/or a UV lamp and/or a hot air source.

The measuring device 50, may comprise a plurality of at least three feeler arranged to measure the position and/or the orientation of at least three points of the finished face of an unfinished optical lens when placed on the positioning device 20. One of the at least three points may be the prism reference point of the unfinished optical lens.

According to an embodiment of the invention, the measuring device may be arranged to measure the position and/or orientation of more than three points, for example four or five; therefore increasing the accuracy of the measured position.

The control device 60 may comprise a camera arranged to be placed over the second surface of an unfinished optical lens when placed on the positioning device. The camera may be link to a screen arranged to display the image of the second face of the unfinished optical lens with a superposed computer generated image of the second surface of the unfinished optical lens.

The blocking system according to the invention may be used so carry out the steps of the blocking method according to the invention.

However, the method according to the invention may be carried out by any other known blocking devices.

The invention has been described above with the aid of an embodiment without limitation of the general inventive concept.

In particular the present invention provides for a method for blocking all kinds of unfinished optical lens, particularly ophthalmic lenses, e.g. single vision (spherical, torical), bifocal, progressive, aspherical, etc. and semi-finished lenses.

The invention claimed is:

1. A method of blocking an unfinished optical lens to be machined, the unfinished optical lens comprising an unfinished face and a second face, the method comprising:
    an unfinished optical lens providing step in which the unfinished optical lens is provided;
    a positioning step in which the unfinished optical lens is positioned in a first reference position by positioning the unfinished face of the unfinished optical lens on the top of at least three pins;
    a preformed optical substrate block providing step in which a preformed optical substrate block is provided; and
    a docking step in which the second face of the unfinished optical lens in the first reference position is docked to the docking surface of the preformed optical substrate block, wherein the docking step is performed without moving the unfinished optical lens.

2. The method of blocking an unfinished optical lens according to claim 1, wherein the second face of the unfinished optical lens is a finished face, wherein the method further comprises prior to the docking step:
    a measuring step in which the spatial positions of at least three predefined points of the finished face of the unfinished optical lens in the first reference position are measured so as to obtain the measured position of the unfinished optical lens; and
    a preformed optical substrate block orienting step in which the preformed optical substrate block is oriented in a second reference position according to the measured position of the unfinished optical lens.

3. The method of blocking an unfinished optical lens according to claim 1, wherein the method further comprises a blocking step in which the unfinished optical lens is blocked in the first reference position.

4. The method of blocking an unfinished optical lens according to claim 2, wherein the method further comprises, after the measuring step and prior to the preformed optical substrate block orienting step, an unfinished optical lens orienting step in which the unfinished optical lens in the first reference position is oriented in a second reference position.

5. The method of blocking an unfinished optical lens according to claim 1, wherein the method further comprises a surface heating step in which at least part of the docking surface of the preformed substrate block is heated at a docking temperature greater than or equal to 50° C. and smaller than or equal to 60° C.

6. The method of blocking an unfinished optical lens according to claim 1, wherein the preformed optical substrate block is made of a thermoplastic material having a softening point greater than or equal to 60° C. and smaller than or equal to 85° C.

7. The method of blocking an unfinished optical lens according to claim 1, wherein prior to the positioning step the top of the at least three pins are placed in a plane.

8. An unfinished optical lens blocking system for blocking an unfinished optical lens on to a preformed optical substrate block, the unfinished optical lens comprising an unfinished face and a second face, the blocking system comprising:
    a positioning device suitable for positioning the unfinished optical lens in a first reference position, the positioning device comprising at least three pins suitable for receiving on the top of the three pins the unfinished face of the unfinished optical lens;
    a preformed optical substrate block receiving device suitable for receiving a preformed optical substrate block; and
    a docking device suitable for docking the second face of the unfinished optical lens in the first reference position to the docking surface of the preformed optical substrate block, wherein the docking step is performed without moving the unfinished optical lens,
    wherein the preformed optical substrate block receiving device is suitable for orienting the preformed optical substrate block in a second reference position, and the blocking system further comprises a measuring device suitable for measuring the spatial positions of at least three points of the finished face of an unfinished optical lens in the first reference position so as to obtain the measured position of the unfinished optical lens.

9. The unfinished optical lens blocking system according to claim 8, wherein the system further comprises a blocking device suitable for blocking the unfinished optical lens in the first reference position.

10. The unfinished optical lens blocking system according to claim 9, wherein the system further comprises an unfinished optical lens orienting device suitable for orienting the unfinished optical lens from the first reference position to a second reference position.

11. The unfinished optical lens blocking system according to claim 8, wherein the blocking system further comprises a heating device suitable for heating the docking surface of the preformed substrate block at a docking temperature greater than or equal to 50° C. and smaller than or equal to 60° C.

12. The unfinished optical lens blocking system according to claim 8, wherein at least the preformed optical substrate block receiving device, the docking device, the measuring device and the preformed optical substrate block orienting device are arranged on a rotating tower.

13. A computer program product for a data-processing device, the computer program product comprising a set of instructions which, when loaded into the data-processing device, causes the device to perform the steps of a method of blocking an unfinished optical lens to be machined, the unfinished optical lens comprising an unfinished face and a second face, the method comprising:
   an unfinished optical lens providing step in which the unfinished optical lens is provided;
   a positioning step in which the unfinished optical lens is positioned in a first reference position by positioning the unfinished face of the unfinished optical lens on the top of at least three pins;
   a preformed optical substrate block providing step in which a preformed optical substrate block is provided; and
   a docking step in which the second face of the unfinished optical lens in the first reference position is docked to the docking surface of the preformed optical substrate, wherein the docking step is performed without moving the unfinished optical lens.

14. A computer readable medium carrying one or more sequences of instructions of a computer program product for a data-processing device, the computer program product comprising a set of instructions which, when loaded into the data-processing device, causes the device to perform the steps of a method of blocking an unfinished optical lens to be machined, the unfinished optical lens comprising an unfinished face and a second face, the method comprising:
   an unfinished optical lens providing step in which the unfinished optical lens is provided;
   a positioning step in which the unfinished optical lens is positioned in a first reference position by positioning the unfinished face of the unfinished optical lens on the top of at least three pins;
   a preformed optical substrate block providing step in which a preformed optical substrate block is provided; and
   a docking step in which the second face of the unfinished optical lens in the first reference position is docked to the docking surface of the preformed optical substrate, wherein the docking step is performed without moving the unfinished optical lens.

\* \* \* \* \*